United States Patent
Perrin et al.

(10) Patent No.: US 8,046,366 B1
(45) Date of Patent: Oct. 25, 2011

(54) ORCHESTRATING INDEXING

(75) Inventors: Stephen Perrin, Chapel Hill, NC (US); Manoj Nair, Cary, NC (US); Iva Blazina Vukelja, Everett, MA (US); John Philip Bell, II, Skibbereen (IE); Alex Rankov, Danville, CA (US)

(73) Assignee: EMC Corporation, Hopkinton, MA (US)

( * ) Notice: Subject to any disclaimer, the term of this patent is extended or adjusted under 35 U.S.C. 154(b) by 248 days.

(21) Appl. No.: 11/692,058

(22) Filed: Mar. 27, 2007

Related U.S. Application Data (60) Provisional application No. 60/826,072, filed on Sep. 18, 2006, provisional application No. 60/826,073, filed on Sep. 18, 2006, provisional application No. 60/826,053, filed on Sep. 18, 2006, provisional application No. 60/826,074, filed on Sep. 18, 2006, provisional application No. 60/826,042, filed on Sep. 18, 2006.

(51) Int. Cl.
*G06F 7/00* (2006.01)
(52) U.S. Cl. ......... 707/741; 707/696; 707/769; 709/223
(58) Field of Classification Search .................. 707/696, 707/769, 741; 709/223; 711/170
See application file for complete search history.

(56) References Cited

U.S. PATENT DOCUMENTS

| | | | |
|---|---|---|---|
| 6,003,040 A | | 12/1999 | Mital et al. |
| 6,167,445 A | * | 12/2000 | Gai et al. ...................... 709/223 |
| 6,308,216 B1 | * | 10/2001 | Goldszmidt et al. .......... 709/236 |
| 6,349,297 B1 | | 2/2002 | Shaw et al. |
| 6,363,053 B1 | | 3/2002 | Schuster et al. |
| 6,430,613 B1 | | 8/2002 | Brunet et al. |
| 6,591,300 B1 | | 7/2003 | Yurkovic |
| 6,633,312 B1 | | 10/2003 | Rochford et al. |
| 6,865,728 B1 | | 3/2005 | Branson et al. |
| 7,185,073 B1 | | 2/2007 | Gai et al. |
| 7,278,156 B2 | | 10/2007 | Mei et al. |
| 7,363,292 B2 | | 4/2008 | Chaboche |
| 7,548,915 B2 | | 6/2009 | Ramer et al. |
| 7,580,357 B2 | | 8/2009 | Chang et al. |
| 7,613,806 B2 | | 11/2009 | Wright et al. |
| 7,616,642 B2 | | 11/2009 | Anke et al. |

(Continued)

FOREIGN PATENT DOCUMENTS

WO WO 2008/036621 3/2008

OTHER PUBLICATIONS

U.S. Appl. No. 11/528,783, Mail Date Feb. 24, 2009, Office Action.

(Continued)

*Primary Examiner* — Belix M Ortiz
(74) *Attorney, Agent, or Firm* — Workman Nydegger (57) ABSTRACT

A method and system for providing data indexing as a customizable service within an information management system. One exemplary method collects information about data objects in a computer system and maps each of the data objects to a service level objective for defining a level of data indexing to be applied to the data objects. The level of data indexing may define whether or not a file will be indexed, and to what extent the file will be indexed. Then, the method orchestrates the data indexing according to the service level objective of each of the data objects. The present invention allows a user to customize data indexing on a file by file basis so that only those files in need of indexing are indexed.

20 Claims, 8 Drawing Sheets

U.S. PATENT DOCUMENTS

| | | | |
|---|---|---|---|
| 7,725,570 B1 | 5/2010 | Lewis | |
| 7,725,571 B1 | 5/2010 | Lewis | |
| 7,730,172 B1 | 6/2010 | Lewis | |
| 7,734,765 B2 | 6/2010 | Musman et al. | |
| 2002/0016800 A1 | 2/2002 | Spivak et al. | |
| 2002/0091746 A1 | 7/2002 | Umberger et al. | |
| 2002/0161883 A1 | 10/2002 | Matheny et al. | |
| 2003/0023587 A1 | 1/2003 | Dennis et al. | |
| 2003/0023712 A1 | 1/2003 | Zhao et al. | |
| 2003/0036886 A1 | 2/2003 | Stone | |
| 2003/0041050 A1 | 2/2003 | Smith et al. | |
| 2003/0093528 A1 | 5/2003 | Rolia | |
| 2003/0140009 A1 | 7/2003 | Namba et al. | |
| 2003/0167180 A1 | 9/2003 | Chung et al. | |
| 2003/0196108 A1 | 10/2003 | Kung | |
| 2003/0212778 A1 | 11/2003 | Collomb | |
| 2003/0233391 A1 | 12/2003 | Crawford et al. | |
| 2003/0233464 A1 | 12/2003 | Walpole et al. | |
| 2003/0236904 A1 | 12/2003 | Walpole et al. | |
| 2004/0098415 A1 | 5/2004 | Bone et al. | |
| 2004/0215650 A1 | 10/2004 | Shaji et al. | |
| 2005/0071182 A1 | 3/2005 | Aikens et al. | |
| 2005/0125768 A1 | 6/2005 | Wong et al. | |
| 2005/0131982 A1 | 6/2005 | Yamasaki et al. | |
| 2005/0132034 A1 | 6/2005 | Iglesia et al. | |
| 2005/0177545 A1 | 8/2005 | Buco et al. | |
| 2005/0197852 A1 | 9/2005 | Gebhard et al. | |
| 2005/0262097 A1 | 11/2005 | Sim-Tang et al. | |
| 2005/0273451 A1 | 12/2005 | Clark et al. | |
| 2006/0015388 A1 | 1/2006 | Flockhart et al. | |
| 2006/0092861 A1 | 5/2006 | Corday et al. | |
| 2006/0095543 A1 | 5/2006 | Ito et al. | |
| 2006/0101084 A1 | 5/2006 | Kishi et al. | |
| 2006/0106782 A1 | 5/2006 | Blumenau et al. | |
| 2006/0112108 A1 | 5/2006 | Eklund et al. | |
| 2006/0236061 A1 | 10/2006 | Koclanes | |
| 2006/0248165 A1 | 11/2006 | Sridhar et al. | |
| 2006/0248187 A1 | 11/2006 | Thorpe et al. | |
| 2007/0055689 A1 | 3/2007 | Rhoads et al. | |
| 2007/0058632 A1 | 3/2007 | Back et al. | |
| 2007/0061363 A1 | 3/2007 | Ramer et al. | |
| 2007/0070894 A1 | 3/2007 | Wang et al. | |
| 2007/0103984 A1 | 5/2007 | Kavuri et al. | |
| 2007/0104208 A1 | 5/2007 | Svensson | |
| 2007/0127370 A1 | 6/2007 | Chang et al. | |
| 2007/0153802 A1 | 7/2007 | Anke et al. | |
| 2007/0192352 A1 | 8/2007 | Levy | |
| 2007/0208751 A1 | 9/2007 | Cowan et al. | |
| 2007/0226228 A1 | 9/2007 | Her et al. | |
| 2007/0294406 A1 | 12/2007 | Suer et al. | |
| 2007/0299828 A1 | 12/2007 | Lewis et al. | |
| 2008/0002678 A1 | 1/2008 | Klessig et al. | |
| 2008/0005086 A1 | 1/2008 | Moore | |
| 2008/0021850 A1* | 1/2008 | Irle et al. | 706/20 |
| 2008/0049642 A1 | 2/2008 | Gudipudi et al. | |
| 2008/0071726 A1 | 3/2008 | Nair et al. | |
| 2008/0071727 A1 | 3/2008 | Nair et al. | |
| 2008/0071813 A1 | 3/2008 | Nair et al. | |
| 2008/0071908 A1 | 3/2008 | Nair et al. | |
| 2008/0077682 A1 | 3/2008 | Nair et al. | |
| 2008/0077995 A1 | 3/2008 | Curnyn et al. | |
| 2008/0097923 A1 | 4/2008 | Kim et al. | |
| 2008/0114725 A1 | 5/2008 | Indeck et al. | |
| 2008/0134043 A1 | 6/2008 | Georgis et al. | |
| 2008/0177994 A1 | 7/2008 | Mayer | |
| 2009/0077210 A1 | 3/2009 | Musman et al. | |
| 2009/0150431 A1 | 6/2009 | Schmidt et al. | |
| 2009/0157881 A1 | 6/2009 | Kavuri et al. | |

OTHER PUBLICATIONS

U.S. Appl. No. 11/528,898, Mail Date Feb. 9, 2009, First Action Interview.
U.S. Appl. No. 11/528,898, Mail Date Apr. 3, 2009, Office Action.
U.S. Appl. No. 11/528,900, Mail Date Jan. 23, 2009, Final Office Action.
U.S. Appl. No. 11/694,753, Mail Date Mar. 25, 2009, Office Action.
U.S. Appl. No. 11/694,783, Mail Date Feb. 6, 2009, Office Action.
U.S. Appl. No. 11/692,051, filed Mar. 27, 2007, Perrin et al.
U.S. Appl. No. 11/694,753, filed Mar. 30, 2007, Nair et al.
U.S. Appl. No. 11/694,764, filed Mar. 30, 2007, Nair et al.
U.S. Appl. No. 11/694,783, filed Mar. 30, 2007, Perrin et al.
U.S. Appl. No. 11/772,179, filed Jun. 30, 2007, John Philip Bell II.
U.S. Appl. No. 11/772,192, filed Jun. 30, 2007, Nair et al.
U.S. Appl. No. 11/528,900, Mail Date Jun. 9, 2008, Office Action.
U.S. Appl. No. 11/528,772, Mail Date Sep. 12, 2008, Pre-Interview First Office Action.
U.S. Appl. No. 11/528,783, Mail Date Nov. 7, 2008, Pre-Interview First Office Action.
U.S. Appl. No. 11/528,898, Mail Date Sep. 5, 2008, Pre-Interview First Office Action.
U.S. Appl. No. 11/528,772, Mail Date Jun. 3, 2009, Final Office Action.
U.S. Appl. No. 11/528,783, Mail Date Jun. 25, 2009, Final Office Action.
U.S. Appl. No. 11/528,900, Mail Date Aug. 25, 2009, Notice of Allowance.
U.S. Appl. No. 11/692,051, Mail Date Aug. 26, 2009, Office Action.
U.S. Appl. No. 11/772,179, Mail Date Aug. 19, 2009, Office Action.
U.S. Appl. No. 11/528,898, Mail Date Oct. 7, 2009, Final Office Action.
U.S. Appl. No. 11/694,753, Mail Date Nov. 18, 2009, Final Office Action.
U.S. Appl. No. 11/864,596, filed Sep. 28, 2007, Nair et al.
U.S. Appl. No. 11/864,605, filed Sep. 28, 2007, Nair et al.
U.S. Appl. No. 11/864,760, filed Sep. 28, 2007, Nair et al.
U.S. Appl. No. 11/864,764, filed Sep. 28, 2007, Nair et al.
U.S. Appl. No. 11/864,770, filed Sep. 28, 2007, Nair et al.
U.S. Appl. No. 11/864,774, filed Sep. 28, 2007, Nair et al.
U.S. Appl. No. 11/528,772, Mail Date Jan. 28, 2010, Office Action.
U.S. Appl. No. 11/528,783, Mail Date Jan. 15, 2010, Office Action.
U.S. Appl. No. 11/692,058, Mail Date Jan. 8, 2010, Final Office Action.
U.S. Appl. No. 11/864,596, Mail Date Nov. 12, 2009, Office Action.
U.S. Appl. No. 11/694,753, Mail Date Mar. 29, 2010, Office Action.
U.S. Appl. No. 11/692,051, Mail Date Feb. 19, 2010, Notice of Allowance.
U.S. Appl. No. 11/692,051, Mail Date Mar. 31, 2010, Notice of Allowance.
U.S. Appl. No. 11/694,764, Mail Date Jan. 28, 2010, Office Action.
U.S. Appl. No. 11/864,770, Mail Date Nov. 27, 2009, Office Action.
U.S. Appl. No. 11/864,770, Mail Date Apr. 21, 2010, Final Office Action.
U.S. Appl. No. 11/772,192, Mail Date Apr. 15, 2010, Office Action.
U.S. Appl. No. 11/864,760, Mail Date Nov. 24, 2009, Office Action.
U.S. Appl. No. 11/864,760, Mail Date Apr. 7, 2010, Final Office Action.
U.S. Appl. No. 11/864,605, Mail Date Jan. 14, 2010, Office Action.
U.S. Appl. No. 11/772,179, Mail Date Feb. 23, 2010, Final Office Action.
U.S. Appl. No. 11/528,772, Mail Date Aug. 10, 2010, Final Office Action.
U.S. Appl. No. 11/528,783, Mail Date Sep. 1, 2010, Final Office Action.
U.S. Appl. No. 11/528,790, Mail Date Jul. 12, 2010, Office Action.
U.S. Appl. No. 11/694,753, Mail Date Oct. 5, 2010, Final Office Action.
U.S. Appl. No. 11/694,764, Mail Date Aug. 4, 2010, Final Office Action.
U.S. Appl. No. 11/772,192, Mail Date Oct. 29, 2010, Office Action.
U.S. Appl. No. 11/864,596, Mail Date May 26, 2010, Final Office Action.
U.S. Appl. No. 11/864,605, Mail Date May 28, 2010, Final Office Action.
U.S. Appl. No. 11/864,605, Mail Date Nov. 4, 2010, Office Action.
U.S. Appl. No. 11/864,760, Mail Date Jul. 27, 2010, Office Action.
U.S. Appl. No. 11/864,770, Mail Date Nov. 3, 2010, Office Action.
U.S. Appl. No. 11/528,772, Mail Date, Mar. 3, 2011, Office Action.
U.S. Appl. No. 11/528,790, Mail Date, Jan. 13, 2011, Final Office Action.

U.S. Appl. No. 11/694,753, Mail Date, Jan. 19, 2011, Office Action.
U.S. Appl. No. 11/694,764, Mail Date, Mar. 17, 2011, Office Action.
U.S. Appl. No. 11/864,596, Mail Date, Mar. 11, 2011, Office Action.
U.S. Appl. No. 11/864,605, Mail Date, Mar. 9, 2011, Final Office Action.
U.S. Appl. No. 11/864,760, Mail Date, Jan. 27, 2011, Final Office Action.
U.S. Appl. No. 11/864,764, Mail Date, Jan. 27, 2011, Office Action.

* cited by examiner

ORCHESTRATING INDEXING

CROSS-REFERENCE TO RELATED APPLICATIONS

This application claims the benefit of:

U.S. Provisional Application Ser. No. 60/826,072, filed Sep. 18, 2006 and entitled "INFORMATION MANAGEMENT";

U.S. Provisional Application Ser. No. 60/826,073, filed Sep. 18, 2006 and entitled "CASCADED DISCOVERY OF INFORMATION ENVIRONMENT";

U.S. Provisional Application Ser. No. 60/826,053, filed Sep. 18, 2006, entitled "ENVIRONMENT CLASSIFICATION";

U.S. Provisional Application Ser. No. 60/826,074, filed Sep. 18, 2006 and entitled "INFORMATION CLASSIFICATION"; and U.S. Provisional Application No. 60/826,042, filed Sep. 18, 2006, entitled "SERVICE LEVEL MAPPING METHOD";

which applications are incorporated herein by reference in their entirety.

BACKGROUND

1. The Field of the Invention

The present invention relates generally to information management. More specifically, the present invention relates to methods and systems for providing data indexing as a service to data residing in a computer system.

2. The Relevant Technology

Modern computer systems allow for the interchange of data and resources through network environments. For example, a modern computer network may include a number of interconnected client computers. The computer network may further include resources. Such resources may be, for example and not limited to, file servers for storing data accessible by the clients, print servers for providing access to printers to the clients, and shared stores on client computers for storing data to be made available to other clients and resources on the network.

In this society where many personal and business interactions are data driven, the ability to provide protection, retention, recovery, security, and other services to data have become important features of computer networks. Establishing a system to provide these services can be costly, both in terms of the equipment and applications necessary to perform the services and particularly in terms of the time required to configure and manage the system. As the amount of data stored by a system increases and the storage systems become more complex, the ability to customize the services provided to each data file is of greater importance.

Data indexing is an example of an application that is often used to create a searchable index of the files on a computer system. Data indexing is an "expensive" procedure, in that it consumes time, computational resources, and storage space. Traditionally, when data indexing is performed, the data indexing service is generally performed on all of the data residing on a computer system, hard drive or volume.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

To further clarify the features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Embodiments of the present invention relate to methods and systems for providing data indexing as a customizable service within an information management system. Data indexing is typically applied to entire computer systems, hard drives, volumes, or other groups of data, often unnecessarily consuming computational resources to index files that do not need indexing. The present invention allows a user to customize data indexing on a file by file basis so that the effort spent indexing each file is selected based on the needs of the file. One exemplary method collects information about data objects in a computer system and maps each of the data objects to a service level objective for defining a level of data indexing to be applied to the data objects. Then, the method orchestrates the data indexing according to the service level objective of each of the data objects.

As used herein, the terms "data" and "data object" may include, but are not limited to, files, directories (e.g., volumes, file systems, and the like), user data, system data, applications, services, operating systems, instructions, and the like, that can be stored on one or more storage devices. Backing up or recovering the data may include backing up or recovering any of the data herein defined or understood by those of skill in the art. Data may be organized in logical directories that do not necessarily correspond to a particular storage device. The term "directory" can be used interchangeably with the term "volume" or "file system" to refer to any means of logically organizing data on a computer.

Certain embodiments described herein will involve electronic communication between a client computer system (hereinafter referred to as a "client") requesting access to a network service at a server computer system (hereinafter referred to as a "server"). Accordingly, the client sends a request to the server for particular access to its system resources, wherein if the client is authorized and validated, the server responds with a response message providing the desired information. Of course, other messaging patterns between client and server are available, as are well known in the art.

It should be appreciated that the present invention can be implemented in numerous ways, including as a process, an apparatus, a system, a device, a method, or a computer-readable medium such as a computer-readable storage medium or a computer network wherein program instructions are sent over optical or electronic communication links. A general purpose computer system such as an Intel-based processor running Microsoft Windows or Linux may be used, or a specialized appliance may be used.

1. Introduction to Information Management Services

Embodiments of the invention relate to information or data management. Information management enables the orchestration of services such as data protection, data placement, corporate compliance, and others based on the needs of the underlying data and the value of the data to the owner of the data. Embodiments of the invention enable the orchestration of data indexing, and integrating data indexing as one of the services offered within a computer system. Using the techniques described herein, an entity can be assured that its data is receiving data indexing on an as-needed basis.

Figure 1:
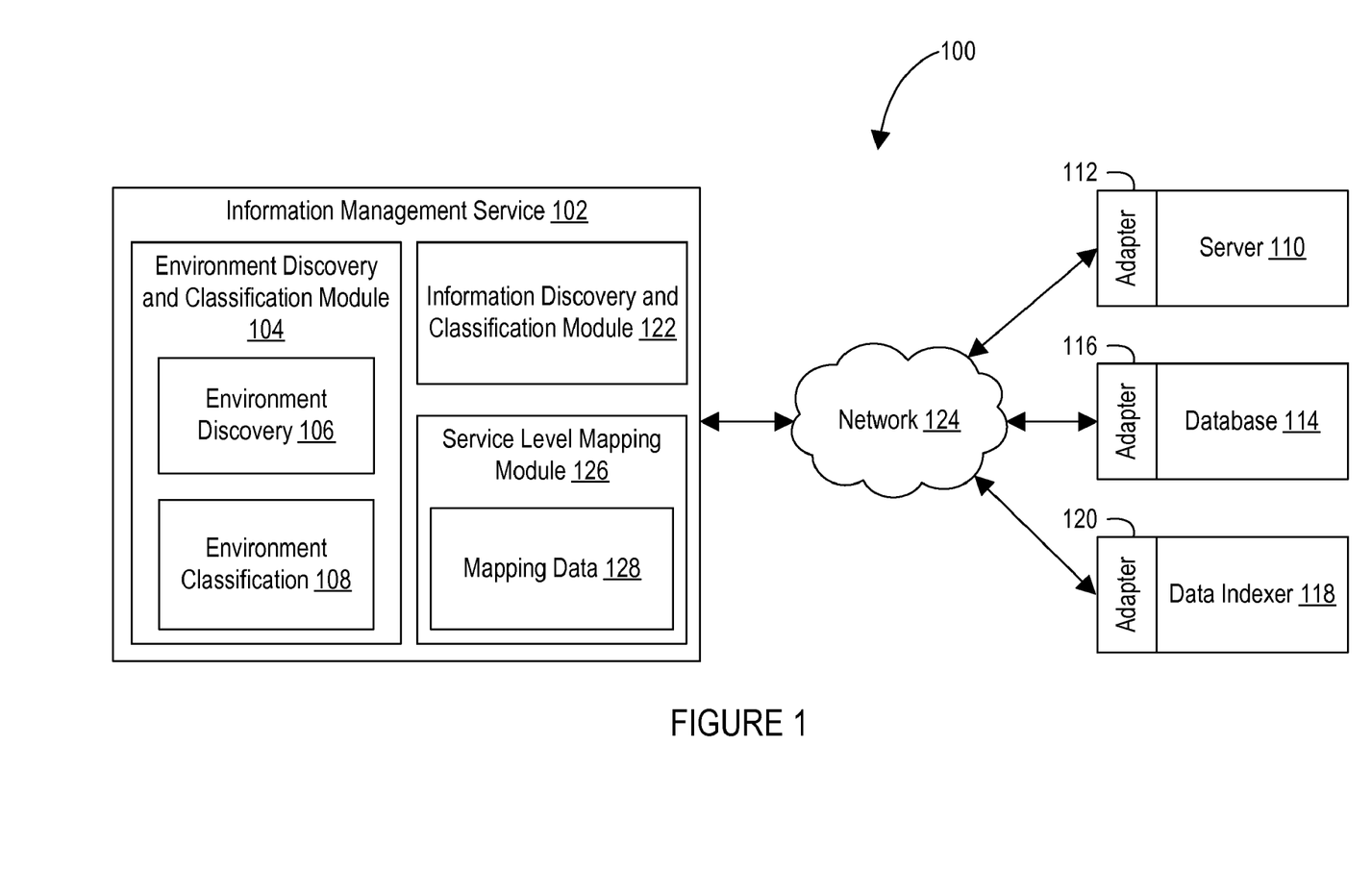
FIG. 1 illustrates a computer system having an information management service configured for classifying the environment components of the computer system, in accordance with the present invention.

Referring to FIG. 1, a computer system 100 is illustrated having various environment components, including a server 110, a database 114, and a data indexer 118. The computer system 100 may include a single computer, a local area network (LAN), metropolitan area networks (MAN), a wide area network (WAN), and the like and combinations thereof. The environment components 110, 114 and 118 and the information management service 102 may be located locally or at a remote location in relation to the clients utilizing the information management service 102.

An information management service 102 may be configured to provide various services, including but not limited to, an information discovery and classification module 122, an environment discovery and classification module 104, a service level mapping module 126, and the like. The information residing in the computer system 100 is discovered and classified by the information discovery and classification module 122. The environment components 110, 114 and 118 that exist within the computer system 100 are discovered and classified by the environment discovery and classification module 104. The service level mapping module 126 is then used for matching the discovered data objects to their service needs, and for the matching their service needs to the appropriate service provider (i.e., environment component) that is capable of providing those needs. Each of the modules 104, 122 and 126 will be described in further detail below, with particular emphasis on their applicability to the orchestration of a data indexing service.

As described previously, the environment discovery and classification module 104 is provided for discovering and for classifying the environment components 110, 114, and 118 that exist within the computer system 100. Although only three environment components are illustrated in FIG. 1, more or less environment components may exist within the computer system 100.

The environment components 110, 114, and 118 may provide a variety of services to the computer system 100 and to the data residing therein. For example, the server 110 may act as a storage server, retention server, data migration server, backup server, recovery server, data protection server, and the like or any combination thereof. The database 114, for example, may act as an exchange database, a payroll database, and the like or any combination thereof. The data indexer 118 may include, for example, the ability to index selected files to allow a user to perform automated searches of the content of the files.

Using the data indexer 118 to index files may drain computational resources, can be very time consuming, and requires a large amount of storage. Therefore, in certain circumstances, it may be in a user's best interest to index a subset of the total number of data objects residing in the computer system instead of indexing all of the data objects residing in the computer system. Furthermore, the present invention employs the information management techniques described below to allow a user to provide data indexing on an object by object basis for preserving computational resources and cutting down on the costs inherent to data indexing.

2. Information Discovery and Classification

A large variety of data objects may be stored within the computer system 100. The data objects may be discovered by the information discovery and classification module 122. The discovered data objects may have a variety of service needs. The service level objectives requested by a data object may be characterized by a set of service areas and a set of service levels. Service areas include generalized areas of service that may be performed on a data object, including data protection (e.g., data backup, redundancy of data, and the like), data retention, data security (e.g., encryption, access control, and the like), data migration, data indexing, and the like. Service levels define the extent at which a service area is provided to the data object. For example, the data indexing service area may include various service levels. A first service level may include a full-scale indexing of a file, including all content of the file. A second service level may include not indexing a file at all. Other levels may include indexing certain parts of a file, including indexing a file's metadata or indexing certain sections of a file, such as a header or abstract portion of a file. Other service levels for data indexing may also be used in addition to those described above.

The services required by each of the data objects may be imposed by the system administrator, governmental standards and regulations, company guidelines, and the like or any combination thereof. A single data object typically requires multiple services from more than one service area. The combination of services requested by a single data object is referred to herein as a "target service package."

A large computer system, such as an enterprise network, may include a large variety of data objects having various unique properties. Consequently, the data objects within a computer system may also request many different service level objectives. By way of example, certain data objects must be retained for one year, while other types of data objects must be retained indefinitely. Likewise, certain data objects must be indexed, while indexing is not necessary, may be overly expensive or may waste valuable resources when performed for other types of data objects. In addition, certain data objects must be saved to a backup location at least once per day, while other types of data objects only need to be saved to the backup location once every week. Within a company or enterprise network, documents created by one division within the company may require a higher level of service than documents created by another division within the company. Furthermore, documents containing predefined words, phrases, or data patterns may require higher levels of service than other types of documents. Other examples of differing service areas and differing service levels required by data within the system will also be evident to one of ordinary skill in the art.

In order to efficiently determine the service level objectives of each data object residing in the computer system 100, the data objects may be classified using the information discovery and classification module 122. In general, the information discovery and classification module 122 may perform an automated classification process, which may classify the data objects in accordance with a predefined set of rules. The predefined set of rules may include customized rules submitted by a user for defining which files are to be indexed. The data objects may be classified based on a number of factors, including the content contained within each data object, the organization, group or individual that created the data object, the metadata associated with each data object, rules defined by a user, and the like and any combination thereof. The metadata may be used to determine the date of last use of the data object, owner of the data object, date of creation, file size, file type, disposition date, content of the object, and the like.

3. Environment Discovery and Classification

Environment components 110, 114, or 118 are often limited as to the service areas and service levels that they are capable of providing. For example, the server 110 may be capable of providing a low level of security services for certain data files that do not require a high level of security, but the server 110 may be incapable of providing high level security services to highly confidential files. Therefore, it may be advantageous to classify the environment components in accordance with the service areas and service levels that each environment component is capable of providing.

Classifying the environment of the computer system 100 may be performed by the environment discovery and classification module 104 as a two step process. First, the system environment is discovered, and second, the discovered environment components are classified in accordance with their service level capabilities. In general, the environment discovery module 106 may create a detailed diagram of each environment component 110, 114, and 118 contained within the computer system 100, as well as the manner in which each environment component interfaces with the other environment components and subsystems within the computer system 100. In order to create a detailed diagram, the environment discovery module 104 may rely on adapters 112, 116, and 120 that are specifically configured to communicate with and gather information from specific environment components 110, 114, and 118, respectively.

In order to classify the environment components 110, 114 and 118, the environment classification module 108 first identifies the environment components compiled by the environment discovery module 106. The environment classification module 108 analyzes the system environment data 106 in order to identify the service level capabilities of the environment components 110, 114 and 118. As described previously, the service level capabilities include the service areas and service levels that each of the environment components 110, 114 and 118 is able to provide to the data objects and other environment components located within the computer system 100.

The environment classification module 108 can then classify the environment components based on their service level capabilities. For example, a first backup server may provide a particular class of information protection service, such as daily backups, and a second backup server may provide a different class of information protection service, such as continuous data protection (CDP). Likewise, the data indexer 118 may be classified based on its ability to index data objects residing in the computer system.

In one embodiment, storage locations are classified based on the service levels that can be provided to the data objects stored at each of the storage locations. In some instances, the services that can be provided to data objects are location-dependant. In other words, the services that are available in a computer system can often only be performed if a data object is located at a specific location. In another embodiment, storage locations are classified based on the data protection services that the storage location requires in order to provide sufficient protection to the data objects it contains. In another embodiment, environment components are classified based on the locations within the computer system that the service applications are capable of providing services to.

4. Service Level Mapping

Once the system environment and the data objects residing in the system have been discovered and classified, the service level mapping module 126 can perform the tasks of selecting service level objectives for each data object and selecting service packages and service providers that are capable of providing the service level objectives.

As mentioned above, indexing files is typically very time consuming, and requires a large amount of storage. Therefore, the present invention employs information management techniques to customize data indexing so that resources are not wasted on data objects that may not need to be indexed. For example, some files, like binary executables, cannot be indexed because they have virtually no textual content. Other files may be transient in nature, meaning that they will be destroyed or deleted soon after they are created. Therefore, many transient files do not justify the resources needed in order to index them. Certain files may be copies of others, such as archival copies. If an original file is already being indexed, there is usually little value to be added by indexing known copies of the original. Furthermore, some files might contain large amounts of text, thereby requiring more computing effort to index, and resulting in index data that consumes large amounts of storage. Therefore, some users may prefer not to spend the indexing resources for very large files. As another example, some files have contents that are very sensitive and/or confidential in nature. In some circumstances, these files should not be included in a general indexing operation unless the search agent that uses the index is able to filter out sensitive search results from unauthorized people doing searches. Alternatively, a second more secure index may be used a way that will be visible only to those with the proper clearance levels. The present invention provides an indexing engine that allows a user to perform data indexing that is customizable on a file by file basis so that the data indexer can account for the above scenarios, as well as others, as will be appreciated by one of ordinary skill in the art.

Figure 2:
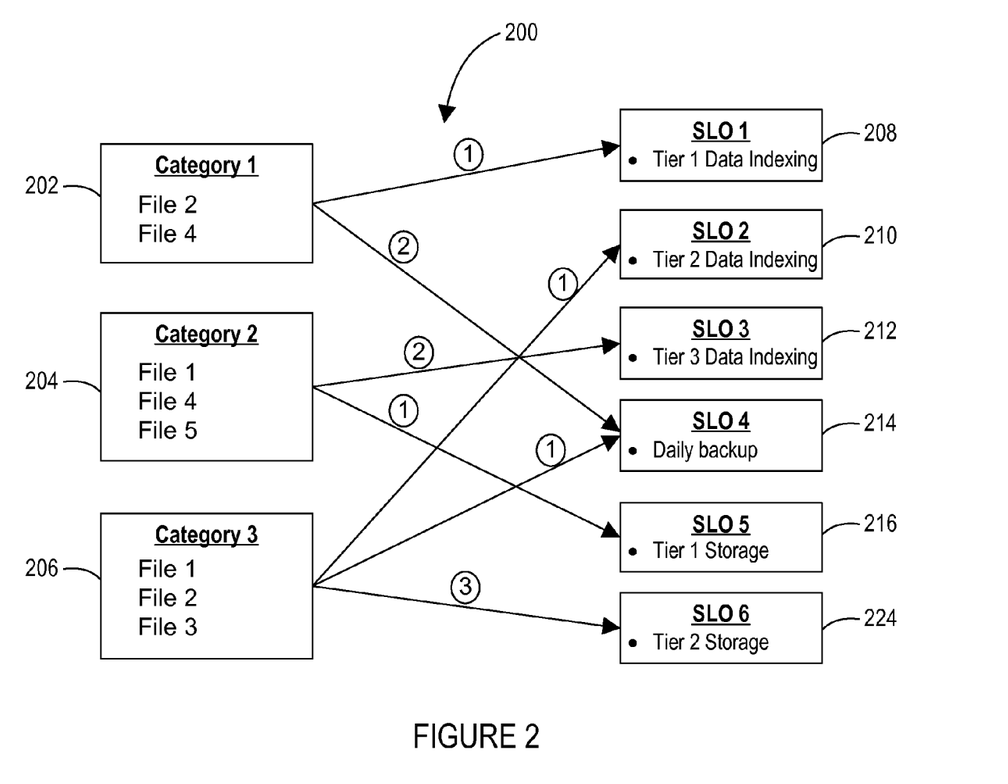
FIG. 2 illustrates an exemplary service level mapping of categories to service level objectives, in accordance with the present invention.

FIG. 2 provides an illustration of an exemplary service level mapping scheme 200 that may be employed by the service level mapping module 126 for matching each data object (i.e., Files 1-5) to the appropriate service level objectives (i.e., Service level objectives 1-6). As illustrated in FIG. 2, the files may be categorized into Categories 1-3 (202, 204 and 206), in accordance with properties associated with the files. By way of example, the first category 202 may include files that originated from a division within a company, such as accounting. The second category 204 may include files that exceed two gigabytes in size. The third category 206 may include files whose content includes private information, such as the social security numbers of customers of the company. The categorization of the files into the categories 202, 204 and 206 may be performed by the information discovery and classification module 122, as described previously.

A variety of different service level objectives may be offered to the files contained within the categories 202, 204 and 206. By way of example, the service level objectives that may be offered to the categories 202, 204 and 206 may include tier 1 data indexing 208, tier 2 data indexing 210, tier 3 data indexing 212, daily backup 214, tier 1 storage 216, tier 2 storage 224, and the like. As will be appreciated by one of ordinary skill in the art, many other service level objectives may be offered in addition to those illustrated in FIG. 2.

Tier 1, tier 2 and tier 3 data indexing 208, 210 and 212 include different levels of data indexing that may be provided to the data objects. For example, Tier 1 data indexing 208 may include a service level for indexing all of the content of a file. Tier 2 data indexing 210 may include a lower level of data indexing, such as a service level for indexing a portion of a file, such as the heading or abstract of a file. Tier 3 data indexing 212 may include a service level that specifies that a file will not be indexed at all. The three tiers of data indexing 208, 210 and 212 are merely provided by way of example, and more or less data indexing service level objectives may be provided. Furthermore, the levels of data indexing may also vary from the example provided above. For example, the available data indexing service levels may simply include "data indexing", and "no data indexing."

After assessing the categories 202, 204 and 206 and the available service level objectives 208, 210, 212, 214, 216 and 224, the service level mapping module 126 maps each of the categories to one or more service level objectives for defining the types of services that will be requested by each category. The mappings are depicted by the arrows drawn from the categories 202, 204 and 206 to the service level objectives 208, 210, 212, 214, 216, and 224. For example, Category 1 (202) is mapped to the Tier 1 data indexing 208, and daily backup 214 service level objectives. Category 2 (204) is mapped to the tier 3 data indexing 212 and tier 1 storage 216 service level objectives. Category 3 (206) is mapped to tier 2 data indexing 210, daily backup 214 and tier 2 storage 224 service level objectives. The generated service level mappings between the categories 202, 204 and 206 and the service level objectives 208, 210, 212, 214, 216 and 224 may be stored, for example, in the form of metadata, in the mapping data structure 128.

As illustrated in FIG. 2, a single file may be included in multiple categories. For example, 'File 1' is included both in Category 2 (204) and in Category 3 (206). Therefore, 'File 1' will receive the services requested by both Category 2 (204) and by Category 3 (206). Because conflicts may arise when a file is included in multiple categories, the mappings from the categories to the service level objectives may be prioritized in order to resolve any conflicts that may arise, as is described in further detail below.

The creation of the service level mappings 200 can be done manually, by the user, or automatically through various programmatic methods, or some combination of manual and automatic methods. For example, in one embodiment, a user manually creates the service level mappings 200 for each category 202, 204 and 206 via a user interface by selecting from the service level objectives 208, 210, 212, 214, 216 and 224 provided by the system. In another exemplary embodiment, a user may establish a rule set for defining service level objectives that will be assigned to particular files and categories having one or more categories. When new files are discovered and classified, as described previously, the rule set is automatically applied to the files and/or categories in order to generate the appropriate service level mappings.

In one embodiment, priorities may be assigned to each of the service level mappings between the categories 202, 204 and 206 and the service level objectives 208, 210, 212, 214, 216 and 224. The priorities may be used in order to resolve any conflicts that may arise between the various service level objectives that may be requested by a single file. In the example illustrated in FIG. 2, the priority levels are positioned adjacent to the arrows representing the service level mappings from the categories 202, 204 and 206 to the service level objectives 208, 210, 212, 214, 216 and 224.

One example service level conflict results in the service level mappings for the categories 204 and 206, which both contain 'File 1'. For example, the category 204 may include files that exceed two gigabytes in size, and the category 206 may include files whose content includes private information, such as the social security numbers of customers of the company, wherein 'File 1' falls within both of these categories. According to the service level mappings, files exceeding 2 GB in size (i.e., Category 204) should not be data indexed (tier 3 data indexing 212), due to the high costs of indexing large files. However, files containing private information (i.e., Category 206) are mapped to tier 2 data indexing 210, meaning that at least a portion of the files should be indexed. In order to resolve this conflict, the priority levels of each service level mapping are compared with one another. Because the priority level of the mapping requesting tier 2 data indexing 210 is a '1', is higher than the mapping requesting tier 3 data indexing 212 is a '2', the tier 2 data indexing is deemed to have a "higher" priority than the tier 3 data indexing. Therefore, the service level mapping module 126 determines that 'File 1' should be provided tier 2 data indexing 210.

In some circumstances, a file may not be included within any category 202, 204 or 206, or may include insufficient properties to categorize or to map the file to a service level. In these situations, it may be necessary to infer the proper service level for the uncategorized file based on other factors. In one embodiment, where a file contains insufficient properties to properly perform service level mapping, the service level mapping module 126 determines the mapping for the file based on its associations with other files. For example, the service level mapping module 126 may identify where the uncategorized file is located. Then, the service level mapping module 126 identifies the other files stored at the same location and the services that the other files are mapped to. The uncategorized file may then be assigned to the same service level objectives that are associated with the other files that are stored at the same location, based on the presumption that many files sharing a common location may also share common attributes and service level needs. This embodiment is only one exemplary technique for inferring service level objectives for uncategorized data objects. As will be appreciated by one of ordinary skill in the art, other techniques may also be employed for assigning service level objectives to uncategorized data objects.

Figure 3:
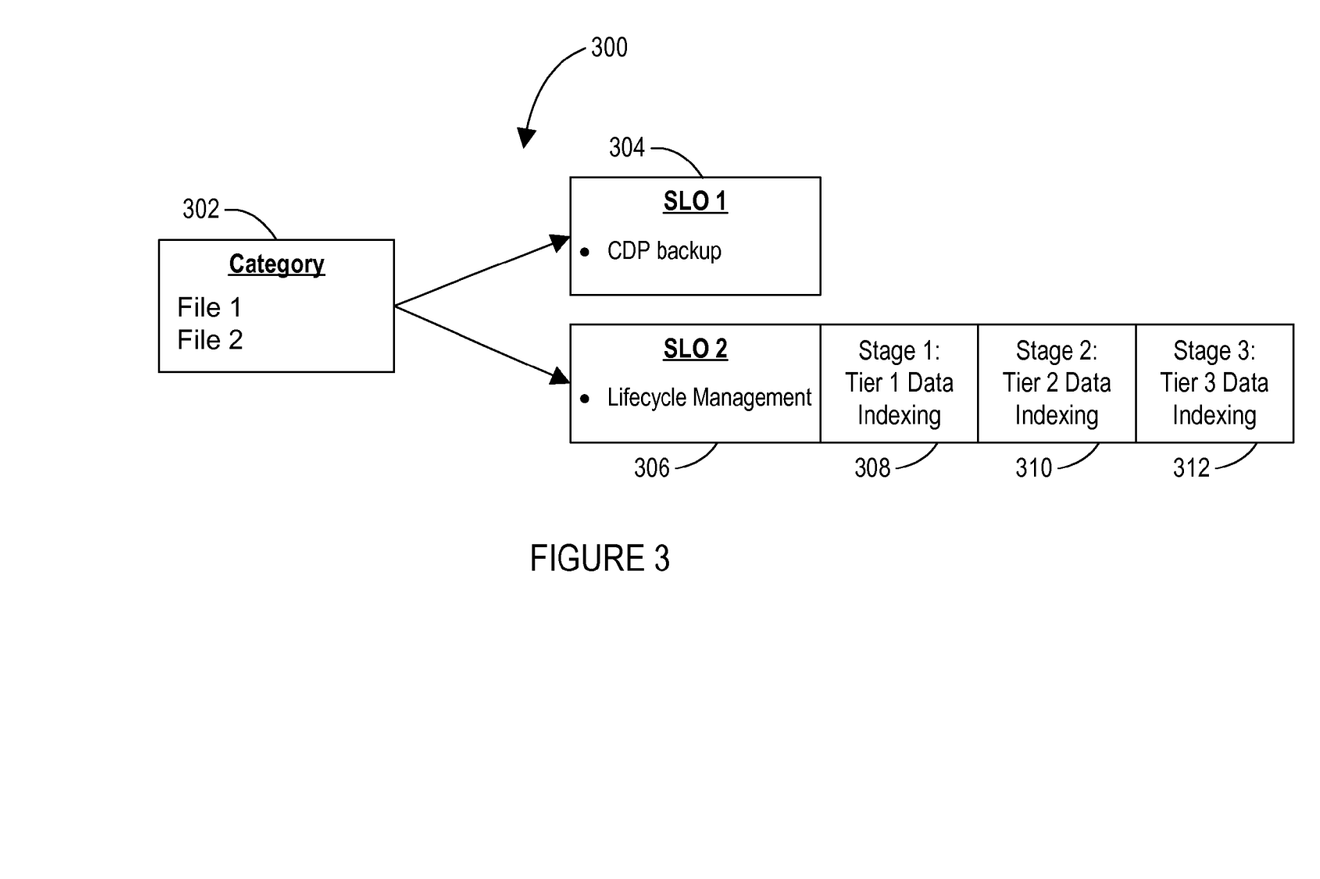
FIG. 3 illustrates an exemplary service level mapping where a category is mapped to a lifecycle management service, in accordance with the present invention.

FIG. 3 is another exemplary illustration of a service level mapping scheme 300 where the category 302 is mapped to a lifecycle management service level 306. The data object or category may be mapped to the lifecycle management service level 306 when the storage location of the data objects is dependent on aging properties associated with those data objects. When a data object or category is mapped to the lifecycle management service level 306, the aging properties of the data object are analyzed prior to selecting the actual service level that will be applied to the data objects. The aging properties that may be analyzed may include any property that may be relevant to the determination of the service level that should be applied to that file, including but not limited to, the amount of time since the data object was created, the amount of time since the data object was last accessed, the amount of time since the data object was last modified, the frequency at which the data object is accessed or modified, and the like and combinations thereof.

In the FIG. 3 example, the lifecycle management service level 306 will determine the level of data indexing provided to the data objects included within the category 302 based on the aging properties of each of the files. For example, a file that was recently created and is often accessed or modified may be assigned to tier 1 data indexing 308. In contrast, the file that has not been accessed or modified for a long period of time may be assigned to tier 2 data indexing 310 or tier 3 data indexing 312. By using lifecycle management to determine storage locations, the cost effectiveness of data indexing can be maximized by limiting the data indexing performed on files that are of low importance or seldom accessed files.

5. Service Package Mapping

Figure 4:
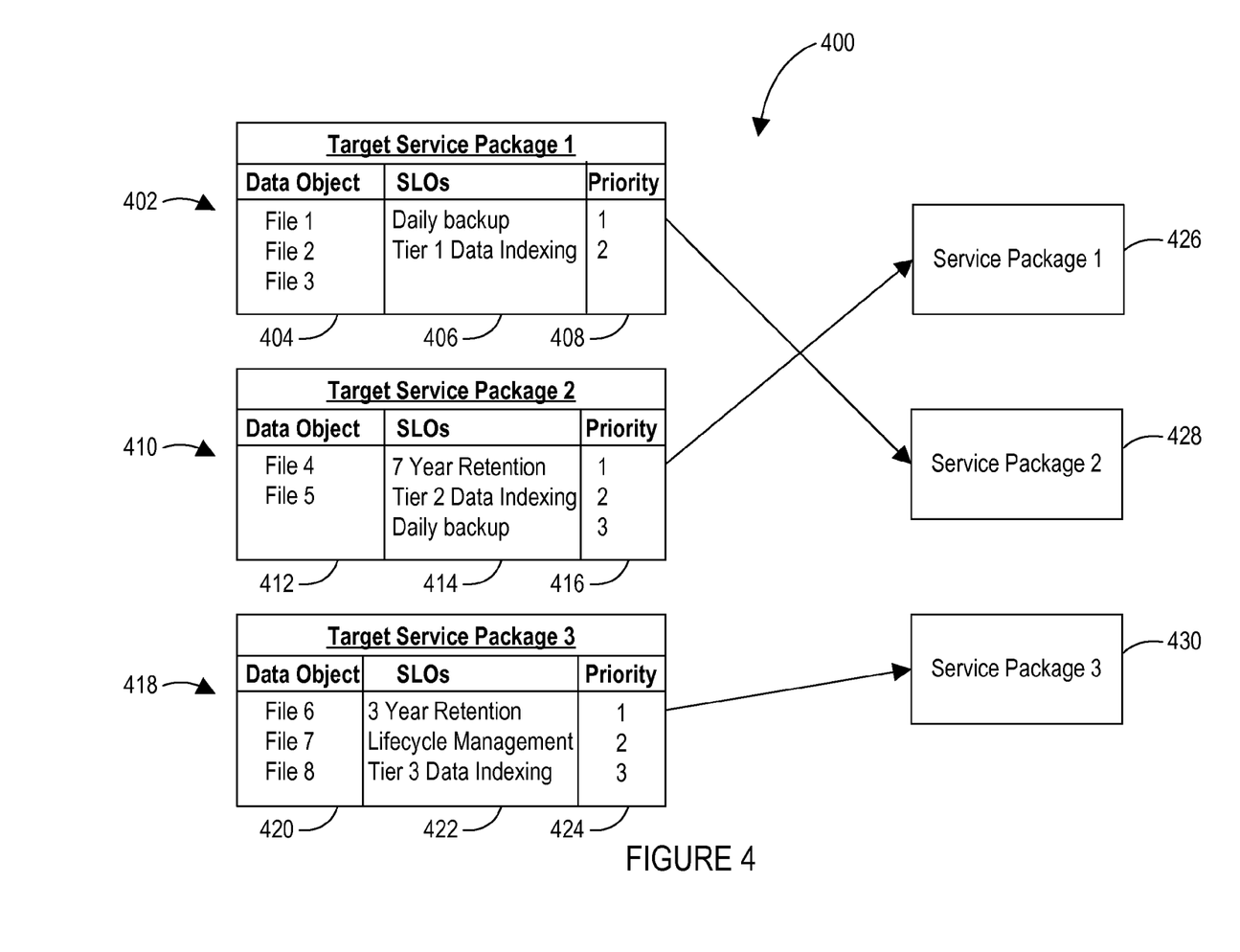
FIGS. 4 and 5 illustrate exemplary mappings of target service packages to the service packages offered by the data center that are most capable of providing the requested service level objectives, in accordance with the present invention.

After performing service level mapping to select the service level objectives for each category 202, 204 and 206, as illustrated in FIG. 2, the service level mapping module 126 maps each of the target service packages to one or more service packages offered by the data center that are most capable of providing the service level objectives contained in the target service packages, as illustrated in FIG. 4. FIG. 4 consists of "target service packages" 402, 410 and 418 on the left and "service packages" 426, 428 and 430 on the right. The "target service packages" 402, 410 and 418 consist of groups of files 404, 412, and 420 that have requests common service level objectives 406, 414 and 422. The "service packages" 426, 428 and 430 consist of the actual bundles of services that are offered by a data center. In some embodiments, the "service packages" provided by a data center may not be able to provide every combination of service level objectives contained in the "target service packages", due to the limited number of "service packages" provided by the data center. FIG. 4 illustrates an exemplary mapping of the target service packages 402, 410 and 418 to a service provider 426, 428 and 430 that is most capable of providing the service level objectives 406, 414 and 422 contained within the target service packages.

Each target service package 402, 410 and 418 may be associated with multiple files, wherein all files contained within a single service package have requested the same group of service level objectives 406, 414 and 422. For example, the target service package 402 includes 'File 1', 'File 2' and 'File 3' (404), each of which has requested CDP backup and data indexing 406. The service level objectives 406, 414 and 422 included within each of the target service packages 402, 410 and 418, respectively, are provided by way of example, and do not necessarily reflect the service level mappings 200 illustrated in FIG. 2.

The service packages 426, 428 and 430 may include a bundle of services offered by one or more environment components to the data objects stored within the computer system. The number of service packages 426, 428 and 430 and the combination of services they each provide may be determined by a data center that specializes in information management services. The services contained in each of the service packages 426, 428 and 430 illustrated in FIG. 4 may be provided by multiple environment components that, taken together, are capable of providing all of the services included within a service package.

The service level mapping module 126 maps each target service package 402, 410 and 418 to one or more service packages 426, 428 and 430 that are best able to provide the service level objectives 406, 414 and 422 of each of the service packages. In one embodiment, the service providers that provide the services offered in the service packages 426, 428 and 430 include environment components that have been classified in accordance with the environment classification techniques provided by the environment discovery and classification module 104 of FIG. 1. Because the service providers have been classified in accordance with their service level capabilities, and the files 402, 412 and 420 have been grouped according to their service level objectives 406, 414 and 422, the service level mapping module 126 can efficiently match the service needs of each target service package to the service package 426, 428 and 430 best capable of providing those needs.

In one embodiment, the service packages 426, 428 and 430 offered by the data center are sufficient in number to provide any combination of service level objectives 406, 414 and 422 that may exist. In this case, the step of mapping target service packages 402, 410 and 418 to the offered service packages 426, 428 and 430 may be unnecessary, and the target service packages may be mapped directly to the service providers capable of providing the necessary service level objectives 406, 414 and 422. However, in another embodiment, only a finite number of service packages 426, 428 and 430 are offered by the data center. Therefore, in some circumstances, some possible combinations of service level objectives may not correspond to a service package 426, 428 or 430 that the data center supports. In this embodiment, user configurable logic may be employed for determining which of the service level objectives 406, 414, and 422 to retain in the event that the data center has elected not to offer service packages that exactly match the target service packages 402, 410 and 418.

For example, priority levels 408, 416 and 424 may be assigned to each of the service level objectives 406, 414 and 422, respectively. When no service package is available that it is capable providing all the service level objectives 406, 414 or 422 of a target service package 402, 410 or 418, the service package that is able to provide the service level objectives having the highest priority levels is identified. Alternatively, multiple service packages 426, 428 and 430 may be identified, wherein the combination of the service packages is capable of providing the service level objectives having the highest priority levels.

By way of example, suppose that service package 1 (426) is capable of providing seven year retention and tier 2 data indexing, while service package 2 (428) is capable of providing daily backup and tier 1 data indexing services. Because service package 1 (426) is capable of providing the service level objectives having the highest two priority levels (i.e., seven year retention and tier 2 data indexing) of target service package 2 (410), while the service package 2 (428) is only capable of providing the service level objective having the lowest priority level (i.e., daily backup), target service package 2 will be mapped to service package 1 (426) in order to meet its highest-priority needs. Likewise, because service package 2 (428) is capable of providing all of the service level objectives of target service package 1 (402), while service package 1 (426) is not capable of providing any of the service level objectives, target service package 1 (402) is mapped to service package 2 (428). The above scenario is merely provided by way of example. In some embodiments, a service level objective can be met regardless of which service package 426, 428 or 430 it is mapped to. For example, in one embodiment, data indexing can be delivered to any data object regardless of which service package it is mapped to and regardless of where the data object is stored.

Figure 5:
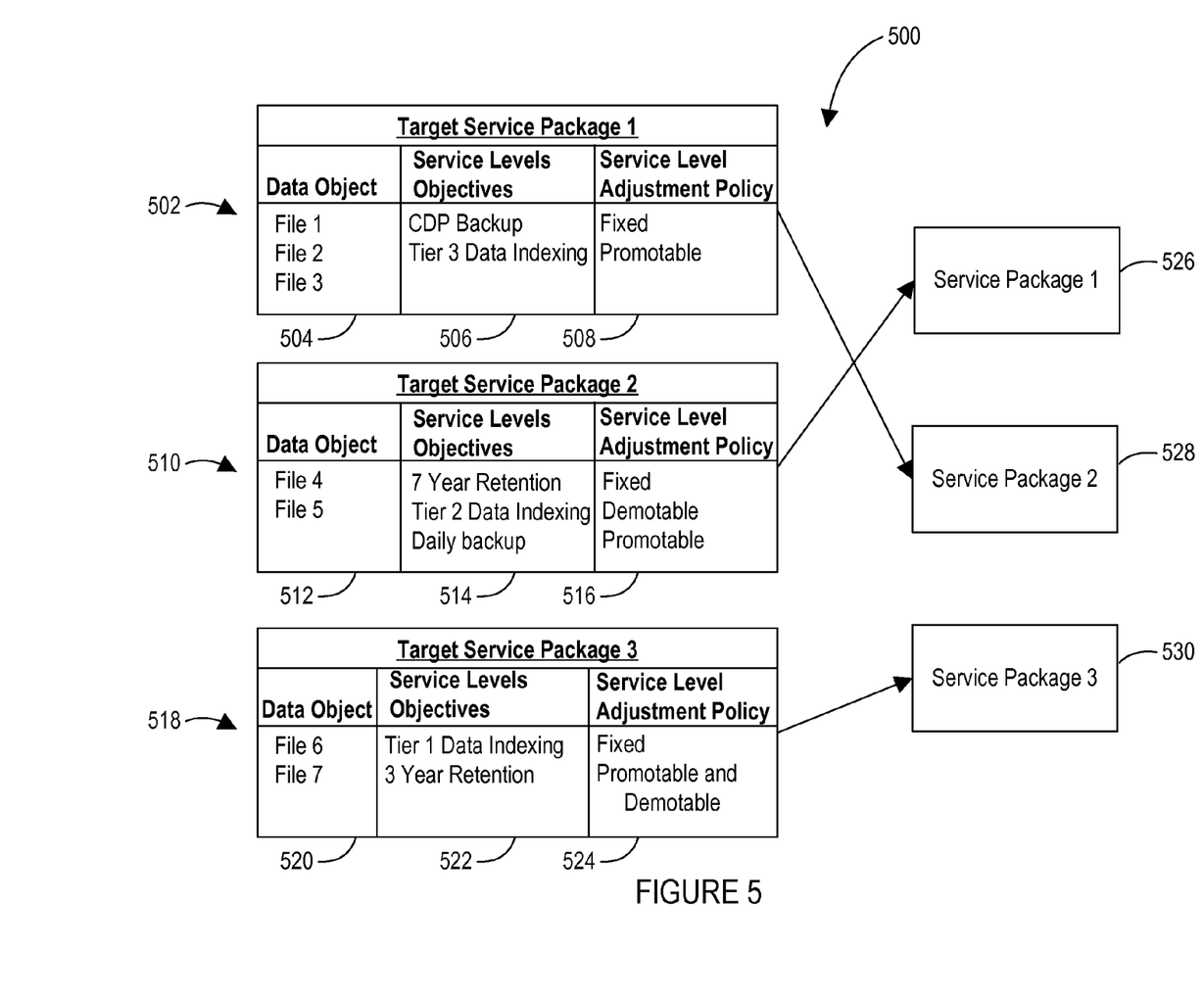

FIG. 5 illustrates another technique that may be employed for matching target service packages 502, 510 and 518 to service packages 526, 528 and 530 when a service package cannot be found that is capable of providing all the service level objectives 506, 514 and 522 of the target service packages. The FIG. 5 example uses service level adjustment policies 508, 516 and 524 to adapt the service level objectives 506, 514 and 522 in the event that the service packages 526, 528 and 530 are unable to provide all of the original service level objectives. By way of example, the service level adjustment policies 508, 516 and 524 may be selected from the following options: 1) a fixed option, wherein the service level objective cannot be changed, or in other words, the service level objective must be provided regardless of whether the other service level objectives are met; 2) a promotable option, wherein the service level objective can be changed to a higher level if the requested service level objective is not available; and 3) a demotable option, wherein the service level objective can be changed to a lower level if the requested service level objective is not available. If a requested service level objective is not particularly important, i.e., other service level objectives within the same service area may also suffice, options two and three may both be selected, such that the priority level may be promoted and demoted.

By way of example, the service level objectives 506 of target service package 1 (502) include CDP backup and tier 3 data indexing. The service level adjustment policies 508 associated with the service level objectives 506 include a 'fixed' requirement for CDP backup and a promotable option for the tier 3 data indexing service level objective. Therefore, if none of the service packages 526, 528 and 530 provide CDP backup and tier 3 data indexing, but service package 2 (528) provides CDP backup and tier 2 data indexing, the original request for tier 3 data indexing is promoted to tier 2 data indexing, and the target service package 1 (502) may be mapped to service package 2. As illustrated in the target service package 3 (518) service level adjustment policies 524, the '3 year retention' service level objective is both promotable and demotable. Therefore, by way of example, instead of requiring three year retention service, the data objects 520 within target service package 3 (518) may instead request one year retention or seven year retention if three year retention is not provided in combination with the other service level objectives 522.

6. Global and Local Views of Data Indexing Rules

Figure 6:
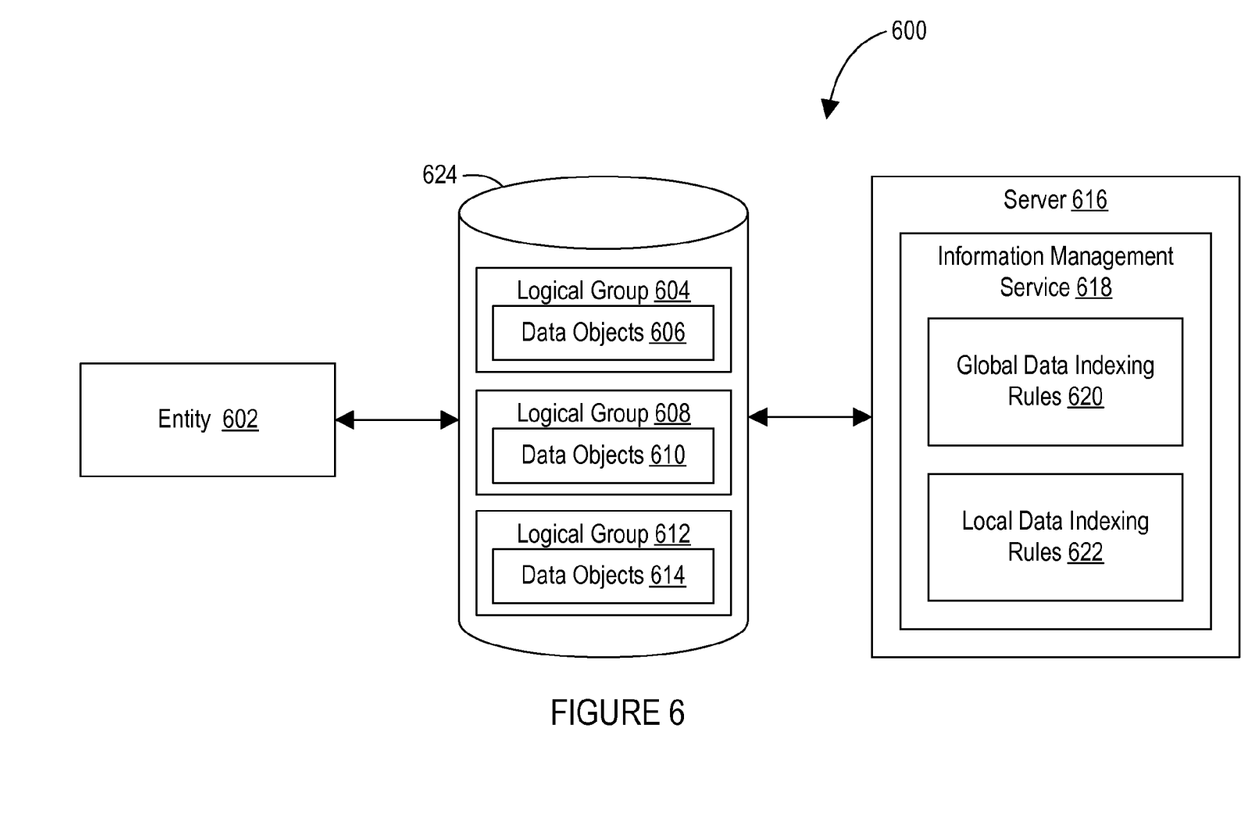
FIG. 6 illustrates a flow diagram of a method for assigning service level objectives to data objects, in accordance with the present invention.

FIG. 6 illustrates an exemplary environment for providing global and local service levels to an entity's information. An entity 602 may consist of an individual, a group of individuals, a company, an organization, a school, a city or municipality, and the like or any combination thereof. A storage location 624 is used by the entity 602 to store data objects 606, 610 and 614, i.e., files, email, data structures, and the like. The storage location 624 may actually include any number of separate storage servers, retention servers, backup servers, and the like or any combination thereof.

The data objects 606, 610 and 614 belonging to a single entity 602 may be divided into one or more logical groups 604, 608 and 612, respectively. The logical groups 604, 608 and 612 may include, for example, departments or "lines of business" within an entity. An engineering firm that performs contract work for the government, for instance, often has data that is associated with the engineering being performed. At the same time, the engineering firm may also have data that is associated with the legal department or corporate aspect of the engineering firm, data that is associated with human resources, data that is associated with accounting, and the like. In other words, a given entity often has various domains of data or different shares of data, some of which may be shared by the various lines of business. These domains, shares, or lines of business are referred to herein as "logical groups" 604, 608 and 612.

Each logical group 604, 608 and 612 may include one or more data objects 606, 610 and 614, respectively. The data objects 606, 610 and 614 within each logical group 604, 608 and 612 may be categorized into categories in accordance with the techniques described in FIGS. 1-3.

Within each logical group of 604, 608 and 612, there are often data objects 606, 610 and 614 that may be subject to certain data indexing requirements that are different from data indexing requirements that exist with respect to data in the other logical groups. For example, a human resources group may require that their files be indexed, while the other files within an entity do not need to be indexed.

In order to provide each logical group 604, 608 and 612 with customized data indexing service levels, the information management service 618 may include local data indexing rules 622 which are meant to be applied to an individual logic group 604, 608 or 612. The local data indexing rules 622 may include a variety of instructions, including classification rules for classifying the data objects 606, 610 and 614 and the environment components that are under the control of the logic group 604, 608 or 612, service level mappings for defining data indexing service levels, rules for mapping target service packages to the service providers that are capable of providing the requested data indexing services, and the like or any combination thereof.

By applying a local rule set to one of the logical groups, 604, 608 or 612, the data indexing services provided to the corresponding data objects 606, 610 or 614 can be controlled in accordance with the needs of each individual logical group. The local data indexing rules 622 may be provided, for example, by an administrator of the logical group 604, 608 or 612 associated with the local rule, such as an IT administrator or other personnel within the department having control over the data stored by the department.

Although certain information management service policies may be customized to meet the requests of each individual logical group 604, 608 and 612, other data indexing service policies may also be applied in a global manner, i.e., to all the data objects 606, 610 and 614 within all the logical groups. The data indexing services that are applied to all logical groups 604, 608 and 612 are referred to as global data indexing rules 620. The global data indexing rules 620 may include a variety of instructions, including classification rules for classifying the data objects 606, 610 and 614 and the environment components of the system 600, service level mappings for defining data indexing service levels, rules for mapping target service packages to the service providers and service packages that are capable of providing the requested services, and the like, or any combination thereof.

Global data indexing rules 620 may include rules specified by an administrator of the entire entity 602. In this case, the global data indexing rules 620 may include information management service policies that cannot vary between each logical group 604, 608 and 612. For instance, a company policy that all files smaller than 1 MB, regardless of which line of business or department, must be indexed with at least tier 2 data indexing, could be included within the global data indexing rules 620.

The global data indexing rules 620 may also be specified by a compliance officer, either from within the entity 602 or a third party. For example, the corporate officer may require that all files containing social security numbers be indexed with tier 1 data indexing, regardless of which logical group 604, 608 or 612 contains the files.

The global data indexing rules 620 may also be specified by a security officer, either from within the entity 602 or a third party. For example, the security officer may require that data objects containing financial records cannot be indexed (e.g., tier 3 data indexing), regardless of which logical group 604, 608 or 612 contains the data object.

De facto global data indexing rules 620 may also exist in accordance with the data indexing services offered by the information management service 618 and the architectural components of the system 600. Any limitations of the information management services 618 and the architecture of the system 600 will be applicable to all the logical groups 604, 608 and 612.

In addition to managing the execution of the global and local rules 620 and 622, the information management service 618 may also possess any of the other abilities described herein for providing customized services to the system 600.

7. Auction Based Service Selection

Figure 7:
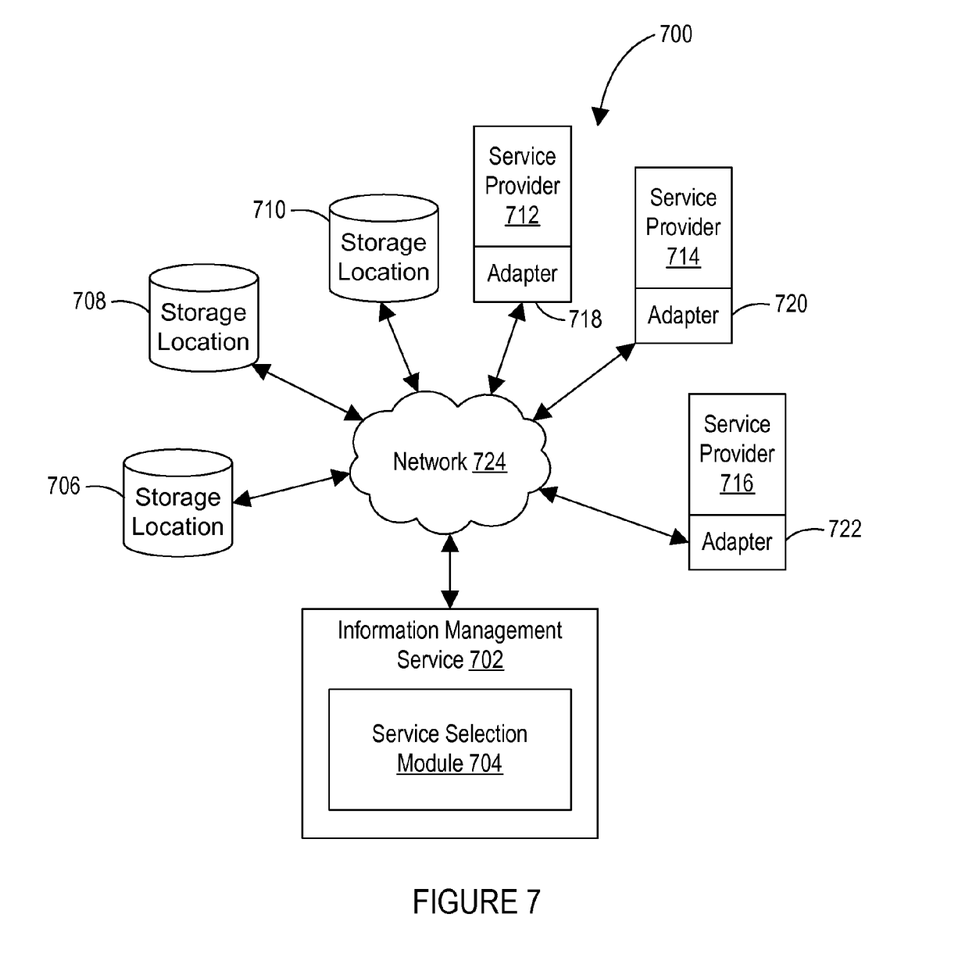
FIG. 7 illustrates a flow diagram of a method for assigning data objects to service providers capable of providing the service level objectives requested by the data objects, in accordance with the present invention.

As described previously, it may be difficult to find service providers that are capable of providing all of the service level objectives of a data object or category. Furthermore, some service providers may only be capable of providing services to data objects located in certain storage locations. FIG. 7 illustrates an information management service 702 having a service selection module 704 capable of performing auction based service selection for selecting the service provider 712, 714 and/or 716 that is capable of providing the requested service level objectives, and for selecting a storage location 706, 708 or 710 that is best to situated for storing the data object.

The service selection module 704 initiates auction based service selection by sending a service request to each of the service providers 712, 714 and 716 to inquire as to whether the service providers are able to provide the service level objectives for a data object or category containing data objects that share the same service level objectives. The service request may include the service package containing each of the service level objectives associated with the data object.

In one embodiment, the service selection module 704 employs adapters 718, 720 and 722 for interfacing with the service providers 712, 714 and 716. The adapters of 718, 720 and 722 may provide a layer of abstraction between the information management service 702 and the service providers 712, 714 and 716 for allowing the information management service 702 to communicate with the service provider without being required to use different communication protocols for each service provider. The adapters and 718, 720 and 722 may further provide information relating to each of the service provider 712, 714 and 716 regarding the service level capabilities of each of the service providers, and other properties that may be useful to the information management service 702.

Upon receiving the service request from the service selection module 704, each of the service providers 712, 714 and 716 and/or the adapters 718, 720 and 722 may analyze the service request in order to determine if the service providers are capable of providing the service level objectives. The service provider 712, 714 and 716 and/or the adapters 718, 720 and 722 may then provide a response to the service selection module 704 containing information regarding which service level objectives the service providers are capable of providing.

In one embodiment, the service request sent by the service selection module 704 to the service providers 712, 714 and 716 may also include a list of potential storage locations 706, 708 and 710 wherein the data objects may be stored. The service providers 712, 714 and 716 and/or the adapters in 718, 720 and 722 may analyze the service request received from the service selection module 704 in light of the potential storage locations 706, 708 and 710. In some circumstances, the service providers 712, 714 and 716 may only be capable of providing services to data objects located in certain storage locations due to network configuration limitations, conflicting communication protocols, user-defined preferences, and the like. Therefore, the service providers 712, 714 and 716 may elect one or more of the storage locations wherein the service provider prefers the data object be stored. The response provided by the service providers 712, 714 and 716 may include the election of one or more of the storage locations 706, 708 and 710. The election specifies which of the storage locations 706, 708 and/or 710 the data objects must be stored in order for the service provider 712, 714 and 716 to provide one or more of the service level objectives.

After receiving the responses from the adapters 718, 720 and 722, the service selection module 704 selects one or more of the service providers 712, 714 and/or 716 that are best able to provide the service level objectives for the data object or category. The service selection module 704 may further determine which of the potential storage locations 706, 708 or 710 the data object or category should be stored in.

In order to perform data indexing and other service levels, a command may be sent to the selected service providers 712, 714 and/or 716. The command to orchestrate the services may, in one embodiment, be sent to the adapters 718, 720 and/or 722, which may then forward the command to the service providers 712, 714 and/or 716.

8. Exemplary Methods for Orchestrating Indexing

Figure 8:
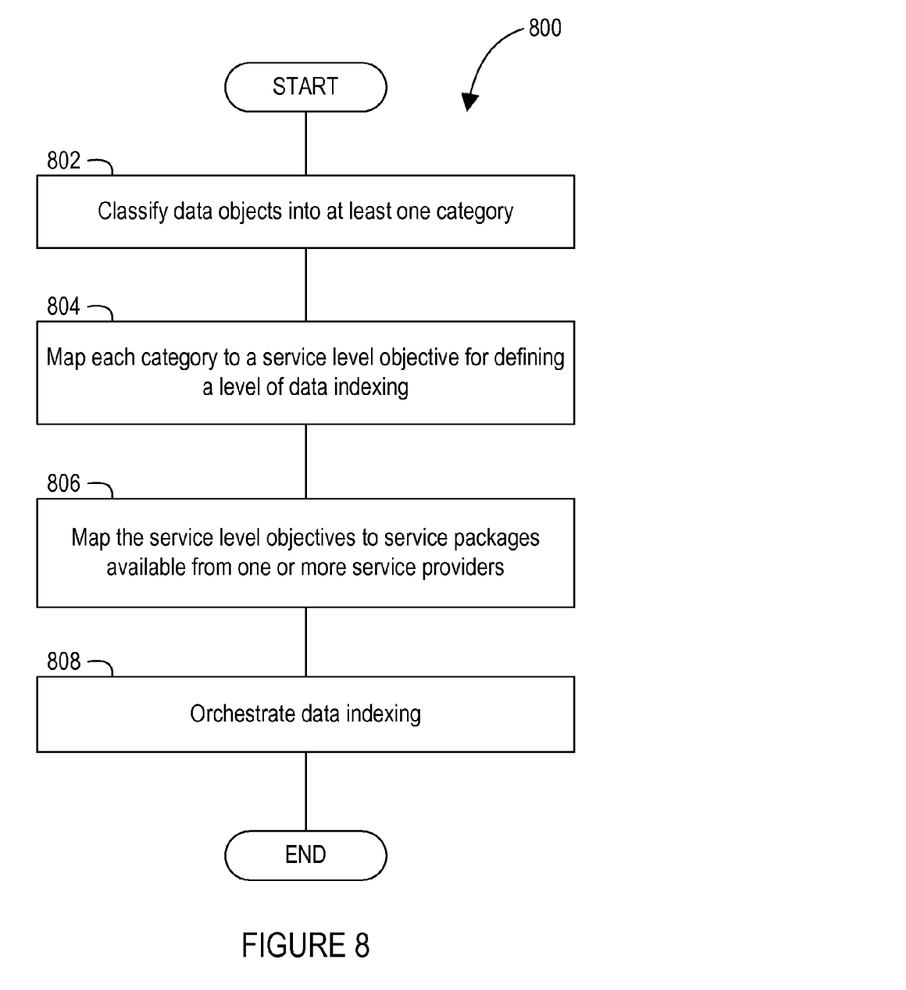
FIG. 8 illustrates an example of a method for providing data indexing.

FIG. 8 illustrates one embodiment of a method 800 of providing data indexing. The method 800 may be practiced, for example, in a computer system having an information management server for providing customized data services to data objects residing in the computer system. The method classifies 802 the data objects into at least one category. In one embodiment classifying 802 the data objects into at least one category may include applying rules to the data objects, wherein the rules use metadata associated with each object. Furthermore, additional metadata may be generated regarding each data object such that the additional metadata is used during classification of each data object.

Each of the categories is mapped to a service level objective for defining a level of data indexing to be applied to the data objects. For example, the service level objective may be selected from two options. First, by selecting a data indexing service level objective, the data objects in the category will be data indexed. Second, by selecting a non-data indexing service level objective, the data objects in the category will not be data indexed. In addition to the two options above, additional data indexing service level objectives may be offered for providing an intermediate data indexing service level for providing data indexing to at least a portion of the data object. For example, the intermediate data indexing service levels my index the metadata of a data object, or a portion of the content of the data object, such as an abstract or a heading.

In one embodiment, the categories may be mapped to at least one other service level objective in addition to the service level objective for defining the level of data indexing. For example, the categories may be mapped to service levels for defining backup service, data storage services, data security service, and the like.

In one embodiment, where categories are mapped to multiple service levels, the method 800 may further include assigning a priority level to each of the mappings. In the event that the mappings conflict with one another, the mappings having higher priority levels are retained and the conflicting mappings having lower priorities may be discarded or ignored.

The service level objectives are then mapped 806 to service packages available from one or more service providers. Where the service package contains multiple service levels, the objectives may be prioritized, and the method 800 may further include mapping the service level objectives to a service package capable of providing the service level objectives assigned to the highest priority levels in the event that a single service package is unable to provide all of the service level objectives.

The method 800 shown in FIG. 8 further includes orchestrating 808 data indexing of the data objects according to the service level objective of each of the data objects. In one embodiment, orchestrating 808 data indexing of the data objects also includes issuing a command to a data indexing service provider, which proceeds to perform the data indexing of the selected data objects. In another embodiment, the command to the service provider is issued via an adapter configured to communicate with the data indexing service provider.

In another embodiment, orchestrating 808 data indexing of the data objects also includes performing auction based service selection to locate a service provider capable of performing the data indexing. As illustrated in FIG. 7, auction based service selection consists of probing each of the available service providers to determine which of the providers is most capable of providing the service package, and to determine where the data object(s) should be stored in order to allow the service provider to perform the services.

Embodiments herein may comprise a special purpose or general-purpose computer including various computer hardware. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computer system, a method for providing data indexing, the method comprising:
   collecting information about data objects in a computer system, wherein the information is used to determine a level of data indexing for each of the data objects and wherein at least some of the data objects are stored in the computer system and wherein data indexing enables at least automated searches of content included in the data objects;
   mapping each of the data objects to a service level objective based on the level of data indexing for each of the data objects, wherein each service level objective is associated with a service package including services to be provided to each data object, wherein the services for some of the service packages include a data indexing service that applies the level of data indexing to each of the data objects according to the service level objective mapped to each of the data objects; and
   orchestrating data indexing according to the service level objective of each of the data objects to create at least one searchable index of at least some of the data objects in the computer system, wherein the data objects are each indexed according to the data objects' level of data indexing in the at least one searchable index and wherein data indexing, enables at least automated searches of content included in the data objects using the at least one searchable index.

2. The method as recited in claim 1, wherein the service level objective is selected from a data indexing service level objective for providing data indexing to the data object and a non-data indexing service level objective for precluding data indexing from being provided to the data object.

3. The method as recited in claim 2, wherein the service level objective is further selected from an intermediate data indexing service level for providing data indexing to at least a portion of the data object.

4. The method as recited in claim 1, further comprising:
   classifying the data objects into categories in accordance with metadata associated with the data objects, and wherein mapping each of the data objects to a service level objective for defining a level of data indexing further comprises mapping each of the categories to a service level objective for defining a level of data indexing to be applied to all of the data objects within the category.

5. The method as recited in claim 1, wherein orchestrating data indexing of the data objects assigned to the data indexing service level objective further comprises:
   issuing a command to a data indexing service provider.

6. The method as recited in claim 5, wherein the command is issued to the data indexing service provider via an adapter configured to communicate with the data indexing service provider.

7. The method as recited in claim 1, wherein orchestrating data indexing of the data objects assigned to the data indexing service level objective further comprises:
   performing auction based service selection to locate a service provider capable of performing the data indexing.

8. The method as recited in claim 1, wherein at least one of the data objects is mapped to at least one other service level objective in addition to the service level objective for defining the level of data indexing to be applied to the data objects.

9. The method as recited in claim 8, wherein the at least one other service level objective conflicts with the orchestration of the service level objective for defining the level of data indexing to be applied to the data objects, the method further comprising:
   assigning a priority level to each of the mappings, wherein the mappings having higher priority levels are retained in the event that the mapping having higher priority levels conflict with the mappings having lower priority levels.

10. In a computer system, a method for providing data indexing, the method comprising:
   classifying data objects into at least one category using at least a level of data indexing that is based on information collected from the data objects, wherein the information is used to determine the level of data indexing for each of the data objects, wherein the at least one category enables the data indexing to be customized for each data object;
   mapping each of the at least one category to a service level objective based on at least the level of data indexing determined for each of the data objects, wherein each service level objective defines the level of data indexing to be applied to the data objects in the service level objectives, wherein the service level objectives define whether all content, a portion of the content, or none of the content of each data object is indexed according to the level of data indexing;
   mapping the service level objectives to service packages available from one or more service providers; and
   orchestrating data indexing of the data objects according to the service level objective of each of the data objects to create at least one searchable index of at least some of the data objects in the computer system, wherein the data objects are indexed according to the corresponding service level objective in the at least one searchable index and wherein data indexing enables at least searching of content in the data objects using the at least one searchable index.

11. The method as recited in claim 10, wherein the service level objective is selected from a data indexing service level objective for providing data indexing to the data object and a non-data indexing service level objective for precluding data indexing from being provided to the data object.

12. The method as recited in claim 11, wherein the service level objective is further selected from an intermediate data indexing service level for providing data indexing to at least a portion of the data object.

13. The method as recited in claim 10, further comprising:
   mapping at least one of the categories to at least one other service level objective in addition to the service level objective for defining the level of data indexing to be applied to the data objects.

14. The method as recited in claim 13, further comprising:
   assigning a priority level to each of the mappings.

15. The method as recited in claim 14, wherein the mappings having higher priority levels are retained in the event that the mapping having higher priority levels conflict with the mappings having lower priority levels.

16. The method as recited in claim 14, wherein mapping the service level objectives to service packages further comprises:
   mapping the service level objectives to a service package capable of providing the service level objectives assigned to the highest priority levels in the event that a single service package is unable to provide all of the service level objectives.

17. The method as recited in claim 10, wherein classifying data objects into at least one category further comprises applying rules to the data objects, wherein the rules use metadata associated with each data object.

18. The method as recited in claim 17, further comprising:
   generating additional metadata regarding each data object such that the additional metadata is used during classification of each data object.

19. The method as recited in claim 10, wherein orchestrating data indexing of the data objects assigned to the data indexing service level objective further comprises issuing a command to a data indexing service provider.

20. The method as recited in claim 19, wherein the command is issued to the data indexing service provider via an adapter configured to communicate with the data indexing service provider.

* * * * *